United States Patent [19]
Grosser et al.

[11] 3,772,641
[45] Nov. 13, 1973

[54] SELF-TESTING EMERGENCY AUTOMOTIVE WARNING SYSTEM

[76] Inventors: Harry W. Grosser, 1309 Forest Ave., Jamestown, N.Y. 14701; William L. Fehlman, 168 Work St., Falconer, N.Y. 14733; Duane Carlson, 71 Pennsylvania Ave., Jamestown, N.Y. 14701

[22] Filed: Mar. 31, 1972

[21] Appl. No.: 239,979

[52] U.S. Cl. .................................. 340/33, 325/364
[51] Int. Cl. ............................................. G08b 3/10
[58] Field of Search ............... 340/33, 32; 325/364, 325/2

[56] References Cited
UNITED STATES PATENTS

| | | | |
|---|---|---|---|
| 3,396,811 | 8/1968 | Bowers et al. | 340/32 X |
| 3,470,479 | 9/1969 | Janc | 325/364 |
| 3,135,951 | 6/1964 | Byrne | 325/364 X |
| 3,130,369 | 4/1964 | Beaton | 325/364 |
| 3,169,223 | 2/1965 | Hudson, Jr. | 325/394 |

*Primary Examiner*—Thomas W. Brown
*Attorney*—Richard C. Sughrue et al.

[57] ABSTRACT

An emergency signal transmitted by a transmitter in an emergency vehicle is received by a radio receiver in an automobile. The received signal is mixed with the output of a continuously operating local oscillator to produce at the receiver output a beat frequency signal which is detected to energize an alarm in the automobile. However, the absence of a signal at the receiver output energizes the alarm to provide a self-testing or fail-safe feature for the receiver.

4 Claims, 1 Drawing Figure

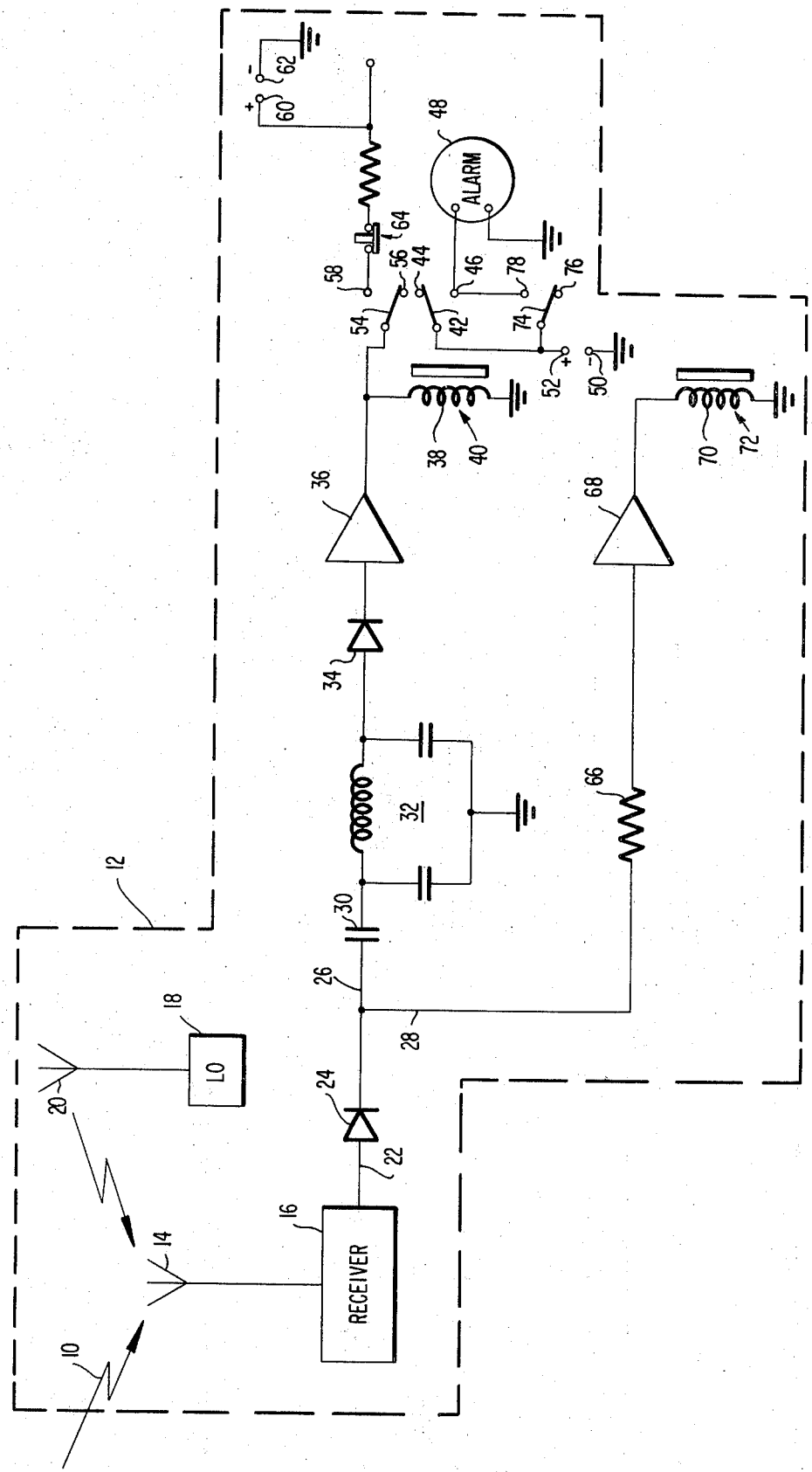

SELF-TESTING EMERGENCY AUTOMOTIVE WARNING SYSTEM

BACKGROUND OF THE INVENTION

1. Field of the Invention

This invention relates to the field of emergency vehicle warning systems and, more particularly, to such a system having a self-testing or fail-safe feature.

2. Description of the Prior Art

Emergency vehicle automotive systems per se are known in the prior art; however, such systems have no means of indicating a failure of the receiver in an automobile. Therefore, an emergency vehicle could be in the area of the automobile, but the inoperative receiver would be incapable of energizing the alarm in the automobile.

SUMMARY OF THE INVENTION

The primary object of the invention is to provide an emergency vehicle warning system in which the receiver is provided with a self-testing or fail-safe feature which will activate an alarm in the event of receiver failure.

BRIEF DESCRIPTION OF THE DRAWING

The FIGURE is a schematic circuit diagram of a preferred embodiment of the invention.

DESCRIPTION OF THE PREFERRED EMBODIMENT

There has been a great deal of interest recently in the need for providing a reliable emergency vehicle warning system of the type in which an emergency vehicle, such as an ambulance, police car, or fire truck, transmits a relatively short range radio signal to be received by nearby vehicles to provide to the drivers thereof warning signals indicating that an emergency vehicle is in the area.

Even though emergency vehicle warning systems generally are known in the prior art, they have not become commercially successful because of their high cost and unreliability. Therefore, the object of this invention is to provide an improved emergency vehicle warning system which is both reliable and inexpensive.

FIG. 1 is a schematic circuit diagram of a preferred embodiment of the invention.

Arrow 10 denotes a radio signal transmitted from a nearby emergency vehicle. A preferred embodiment of the emergency signal receiving apparatus mounted in other vehicles is denoted by the reference numeral 12.

A receiver antenna 14 receives the emergency radio signal 10 and applies it to the input of a conventional radio receiver 16. Also forming a part of the receiving apparatus is a local oscillator 18 having an auxiliary transmitting antenna 20 which radiates a signal at the local oscillator frequency. This radiated signal is also picked up by the receiver antenna 14 and applied to the receiver 16. Consequently the output of the receiver at point 22 is a beat signal having a beat or difference frequency equal to the difference between the frequencies of the emergency signal 10 and the local oscillator signal.

In practice, the frequency of the local oscillator is chosen to be very close to that of the predetermined emergency signal. A typical value for the emergency signal would be 10 megahertz, and a typical value for the local oscillator signal is 10 megahertz ± 1,000 cycles per second. Therefore in a typical case the beat frequency would be 1,000 cycles per second. Of course these frequencies are merely exemplary, and other frequencies could be chosen while still remaining within the scope of the invention.

The beat frequency signal at the output of receiver 16 is detected by a diode detector 24 and then fed via a conductor 26 to an alarm circuit and also via a conductor 28 to a self-testing or fail-safe circuit. The detected beat frequency tone signal appearing on conductor 26 is fed through a D.C. blocking capacitor 30 and a filter circuit 32 which is designed to pass only a frequency equal to the difference between the local oscillator frequency and the predetermined emergency signal frequency. This filter may be of any suitable type such as a $\pi$, T, L, or RC filter. The output of the filter 32 is fed through a diode rectifier 34 and an optional D.C. amplifier 36 to a relay coil 38 of a normally open relay 40. The switch arm 42 of relay 40 is normally in engagement with the open circuited terminal 44. However, upon energization of the relay coil 38 by the output of the amplifier 36, the switch arm 42 attracted to the terminal 46, thereby closing the relay and completing a circuit between an alarm device 48 and a suitable D.C. power supply connected across terminals 50 and 52, thereby actuating the alarm device to provide a warning to the driver of the vehicle. In a typical case, the D.C. power supply is the 12-volt battery of a conventional automobile.

Relay 40 remains closed as long as the emergency signal is being received by receiver 16 to maintain relay coil 38 energized. However, the path of the automobile or emergency vehicle may be such that a radio signal absorbing means appears between the emergency vehicle and the automobile, thereby causing de-energization of relay 40. For example, one of the vehicles may pass through a tunnel or travel over a bridge having a heavy metal superstructure. To avoid this undesired interruption of the emergency signal, a holding circuit is provided for relay 40. Upon initial energization of relay coil 38, another relay switch arm 54 normally in engagement with a relay terminal 56 is attracted to terminal 58 to close a circuit between the relay coil 38 and a D.C. power supply connected across terminals 60 and 62. This holding circuit maintains relay coil 38 energized, and thereby alarm 48 actuated, until the normally closed reset switch 64 is operated to break the holding circuit.

The D.C. signal appearing on conductor 28 is fed through an isolation resistor 66 and an optional D.C. amplifier 68 to the relay coil 70 of a relay 72. The circuit is designed so that the local oscillator 18 is in continuous operation so that, even in the absence of an emergency warning signal from the emergency vehicle, receiver 16 is always receiving an input signal from the local oscillator. The detection of this local oscillator signal by detector 24 provides the D.C. signal which is fed to relay coil 70. Therefore, relay 72 is normally energized by this D.C. signal derived from the local oscillator. When the relay coil 70 is so energized, its switch arm 74 is in engagement with the open circuited relay terminal 76. However, if the local oscillator 18 or the receiver 16 should fail and cease operating, or if there should be no signal at the output 22 of the receiver 16 for any reason, the D.C. signal on conductor 28 will disappear, thereby de-energizing relay coil 70 and causing the relay to return to its normally closed position, i.e., switch arm 76 moves into engagement with relay terminal 78. When relay 72 is in its closed position, alarm 48 is connected across the terminals 50 and 52, thereby causing actuation of the alarm.

Of course, the alarm device 48 may comprise either a single device which is actuated both by the emergency signal and by the fail-safe or self-testing signal or else the alarm may consist of one or more devices, one of which is actuated by the emergency signal and one of which is actuated by the fail-safe signal. Furthermore, the alarm device 48 may consist of either visual or audible alarm devices, or a combination of both.

Even though the above preferred embodiment has been described as responding to an emergency signal transmitted by a transmitter on a moving emergency vehicle, the invention is also to be understood as including a stationary emergency transmitter positioned near a site where an emergency situation exists. Such situations may be, for example, an unsafe bridge, tunnel, road construction, or wash-out, stopped school bus, railroad crossing, etc. Furthermore, the term, vehicular, is meant to include boats, airplanes, etc.

While the invention has been particularly shown and described with reference to a preferred embodiment thereof, it will be understood by those skilled in the art that various changes in form and detail may be made therein without departing from the spirit and scope of the invention as defined in the appended claims.

We claim:

1. A self-testing receiving apparatus for a vehicular emergency warning system comprising:
    a. a first antenna mounted on a vehicle for receiving an emergency radio signal transmitted from a nearby transmitter,
    b. a radio receiver mounted in said vehicle and connected to said antenna,
    c. a local oscillator mounted in said vehicle and radiating from a second antenna a local radio signal different in frequency from said emergency signal,
    d. said local signal also being received by said first antenna to produce at the output of said receiver a beat signal having a frequency equal to the difference between the frequencies of said emergency and local signals;
    e. alarm means mounted in said vehicle,
    f. first circuit means coupled between said alarm means and the output of said receiver for blocking said local signal, but passing said beat signal to actuate said alarm means to indicate the reception of said emergency signal, and
    g. second circuit means coupled between said alarm means and the output of said receiver and responsive to the absence of both said beat and local signals at said receiver output for actuating said alarm means to indicate the absence of a receiver output signal.

2. A self-testing receiving apparatus as defined in claim 1 wherein said local signal frequency is close to said emergency signal frequency, and wherein said first circuit means comprises:
    a. frequency selective circuit means responsive only to the beat frequency for producing a alarm signal, and
    b. normally open relay means connected between said frequency selective circuit means and said alarm means,
    c. said relay means being closed by said alarm signal to actuate said alarm means.

3. A self-testing receiving apparatus as defined in claim 2 wherein said second circuit means comprises a normally closed relay coupled between said alarm means and the output of said receivers, said normally closed relay means being opened by the presence of a receiver output signal, whereby the absence of said receiver output signal causes said normally closed relay to close and actuate said alarm means.

4. A self-testing receiving apparatus as defined in claim 2 wherein said first circuit means further comprises a holding circuit for maintaining said relay means closed after it has been initially closed by said alarm signal.

* * * * *